United States Patent [19]

Giffin

[11] Patent Number: 4,585,240

[45] Date of Patent: Apr. 29, 1986

[54] CENTERING AND HOLDING DEVICE FOR USE WITH A POTTER'S WHEEL APPARATUS

[75] Inventor: Brian K. Giffin, Boulder, Colo.

[73] Assignee: Giffin Earthworks, Inc., Boulder, Colo.

[21] Appl. No.: 542,104

[22] Filed: Oct. 14, 1983

[51] Int. Cl.[4] ........................ B23B 31/16; B23Q 3/06; B28B 1/29

[52] U.S. Cl. .................................... 279/111; 279/1 L; 279/1 Q; 279/1 SJ; 279/114; 425/263; 425/459

[58] Field of Search ............. 279/1 J, 1 L, 1 Q, 1 SJ, 279/17, 114–116, 111; 269/156, 95, 97; 425/263, 459

[56] References Cited

U.S. PATENT DOCUMENTS

| | | | |
|---|---|---|---|
| 3,366,393 | 1/1968 | Bullard, III | 279/111 |
| 3,751,053 | 8/1973 | Swanson | 279/1 L X |
| 3,849,054 | 11/1974 | Jordache | 425/459 |
| 4,222,577 | 9/1980 | Giffin | 279/1 SJ X |
| 4,434,684 | 3/1984 | Nixon | 279/111 X |

*Primary Examiner*—Gil Weidenfeld
*Assistant Examiner*—Steven C. Bishop
*Attorney, Agent, or Firm*—Donald W. Margolis

[57] ABSTRACT

Method and apparatus for centrally mounting one circular plate relative to another circular plate. The use of such method and apparatus in conjunction with a device for centering and holding a piece of pottery in a central position relative a potter's wheel axis is described.

20 Claims, 14 Drawing Figures

CENTERING AND HOLDING DEVICE FOR USE WITH A POTTER'S WHEEL APPARATUS

BACKGROUND OF THE INVENTION

The use of a potter's wheel to make pottery is one of the oldest uses of the wheel, perhaps predating use of the wheel for transportation. The pottery wheel as used today is very similar to that used in ancient times and consists essentially of a circular wheel head with a planar upper surface which is centrally mounted on a vertical shaft. The wheel head is rotated, either manually or with a motor driven system, about a central axis of rotation coaxial with the vertical shaft. A mass of wet clay is mounted at a central position on the potter's wheel and is shaped or "thrown" by manually manipulating the clay as the potter's wheel rotates. Sidewalls of a pottery vessel are created by this manipulation and are essentially completed during the throwing process. However, the bottom or "foot" of the pot cannot be finished during the throwing process. A pot is wet and very delicate after being thrown, and must be allowed to dry partially to a state known as "leather hard" before the bottom can be finished or "trimmed". During trimming, the pot is mounted upside down on the potter's wheel and held in position while the wheel turns and a trimming tool is pressed against it to cut the foot. During this trimming process, the clay is no longer wet and sticky and therefore recentering and retaining the inverted pot on the potter's wheel is very difficult. The traditional solution for retaining the pot on the potter's wheel is to place the pot in an inverted and centered position on the potter's wheel and then to place soft clay around the pot to hold it in position on the wheel. This has been a poor solution in that the holding clay, when too wet, sticks to the pot and recessitate an additional cleaning process after trimming. However, if the holding clay is too dry, the pot will not be retained on the wheel and may fly off and break while being trimmed. The very act of centering the pot by hand is very difficult, requiring both persistence and talent. An apparatus for both centering and holding a pot on a potter's wheel during trimming is the subject of my U.S. Pat. No. 4,222,577 issued Sept. 16, 1980, which is hereby incorporated by reference for all that it contains. However, although the device described in my prior patent provides a means for centering a pot on a holding apparatus which is attached to the potter's wheel, it creates another problem: how to quickly and accurately attach the centering and holding device in a centered position relative to the potter's wheel head. If the centering and holding device is itself not properly centered on the potter's wheel, then any pot held by it will rotate eccentrically, causing an annoying wobble and, if the eccentricity is sufficiently large, preventing the pot from being accurately trimmed. It is thus desirable to provide centering apparatus for accurately centering the pot centering and holding apparatus on the potter's wheel head.

SUMMARY OF THE INVENTION

It is an object of the present invention to provide a centering and holding device for a potter's wheel head which may be quickly and accurately centered and mounted on a potter's wheel head whereby the centering and holding device may accurately center and hold a piece of pottery on the upper surface thereof for trimming or other manipulation.

The present invention thus comprises a centering and holding device for use on a potter's wheel head having a substantially circular periphery symmetrically positioned about a potter's wheel central axis of rotation. The device may comprise upper plate means for supporting a pottery piece to be trimmed; holding means adjustably mounted on said upper plate means for adjustably holding the pottery piece at a centered location on said upper plate means; lower plate means operably attached to said upper plate means and to said potter's wheel head for cooperating with said holding means to provide adjustable radial movement thereof; plate coupling means for operably attaching said upper plate to said lower plate in a predetermined, axially centered, frictionally rotatably displaceable relationship; potter's wheel head mounting means for mounting said lower plate means in fixed relationship on said potter's wheel head; and lower plate centering means for precisely centering a predetermined central axis of said lower plate means in substantially coaxial relationship with respect to said potter's wheel head central axis of rotation.

The potter's wheel head mounting means may comprise a plurality of clamp means operably attached to said lower plate means and clampingly engageable with peripheral surface portions of the potter's wheel head.

The lower plate centering means may comprise radially extending guide means for guiding each of said plurality of clamp means along a precise path of travel projecting radially outwardly from said predetermined central axis on said second plate means; clamp locating means for facilitating location of said clamp means along said path of travel at selected radial distances from said lower plate central axis; and clamp holding means for holding said clamp means at selected radial locations along said path of travel.

The radially extending guide means may comprise a radially extending guide rib on a lower surface of said lower plate means and a guide rib accepting groove portion on one of said clamp means.

The clamp holding means may comprise a plurality of equally radially spaced apart holding ribs extending perpendicular to said guide rib on the lower surface of said lower plate means; and a plurality of teeth on an upper surface of said clamp means adapted to matingly engage said holding ribs; and bolt means operably mountable in bolt holes provided at predetermined positions in said lower plate and adjustably receivable in radially extending clamp slot means in said clamp means for urging said teeth on said clamp means into locking engagement with said holding ribs at a selected radial position on said lower plate means.

The locating means may comprise guide path scale means for providing predetermined reference marks on said lower plate means; and pointer means on said clamp means for providing a predetermined reference point on said clamp means positioned in readably proximate relationship with said scale means.

The scale means may comprise said holding ribs.

The measuring means for measuring the diameter of said potter's wheel head, may comprise a scale having scale units of twice the dimension of scale units on said guide path scale means.

The guide path scale means may be radially relatively positioned along each guide path whereby a scale reading indicates a scale distance from said lower plate predetermined central axis.

The pointer means on each said clamp may be positioned in substantial axial alignment with a point on the clamp means making contact with the potter's wheel head lateral periphery.

The adjustable clamp means may comprise a unitary, L-shaped, resilient member having a first radially extending leg portion positioned in generally parallel relationship with said lower plate means in contacting engagement therewith, and having a second generally axially extending leg portion integrally formed with said first leg portion and positioned in contacting engagement with the potter's wheel head lateral peripheral surface.

The clamp means first leg portion may comprise an upper surface having chordwise extending teeth means for holdingly engaging chordwise extending ribs on said lower plate lower surface; and a lower surface having a contact portion thereon for engagingly contacting an upper surface of the potter's wheel head.

The second leg portion may comprise a relatively narrow connection portion connecting said second leg portion to said first leg portion, said connection portion extending radially outwardly from said first leg portion and having a pointer means thereon for pointing at scale units on an associated scale on said lower member; and a relatively narrow neck portion integrally formed with said connection portion and extending axially downwardly therefrom whereby said lower leg means is inwardly and outwardly flexibly displaceable by bending at said neck portion.

The second leg portion may comprise a first inner surface positionable into contacting engagement with the lateral peripheral surface of the potter's wheel head, said inner surface extending axially downwardly and radially inwardly from said connection portion; and a second inner surface extending downwardly and outwardly and integrally connected with said first inner surface, said second inner surface being beveled at an angle to cause outward flexing of said second leg when said second inner surface is urged downwardly against an upper peripheral edge of the potter's wheel head during mounting of the lower plate thereon.

In one embodiment in an unflexed position, the first inner surface is positioned at an angle of between 2° and 10° from an axial orientation and said second inner surface is positioned at an angle of between 15° and 60° from an axial orientation.

The invention also includes a method of centrally mounting a pottery centering device on a circular potter's wheel head, comprising the steps of:

(a) measuring the diameter of the circular potter's wheel head with a first scale device;
(b) moving a plurality of radially displaceable potter's wheel clamps to selected positions on a plurality of radially extending guide tracks formed on a lower plate of the centering device by placing a marker on each clamp into aligned relationship with an associated locating scale on the lower plate at a position on the locating scale corresponding to the wheel diameter measured by the first scale device;
(c) locking the clamps into position by urging teeth on each clamp upper surface into engaging contact with ribs provided as unit indicators on the lower plate locating scales;
(d) pressing potter's wheel engaging portions of the clamps into clamping engagement with the potter's wheel head so as to affix the lower plate onto the head; and
(e) securing an upper plate used for holding a pottery piece to the lower plate in a predetermined centered relationship.

The method may include the steps between step (d) and (e) of:

(i) observing the clamp axially extending potter's wheel engaging portion to determine if it is flexed radially outwardly;
(ii) upon determining that the clamp potter's wheel engaging portion is flexed radially outwardly, removing the lower plate from the potter's wheel head;
(iii) loosening the clamps on the lower plate;
(iv) moving each clamp one scale unit outwardly;
(v) retightening each clamp on the lower plate;
(vi) remounting the lower plate on the potter's wheel head;
(vii) repeating the steps (i) through (vii) until achieving a mounting relationship between the lower plate and wheel head wherein the clamp wheel head engaging portions are not flexed radially outwardly.

The method may also include the steps between steps (d) and (e) of:

(i) grasping the lower plate and rotating it back and forth to determine if the lower plate is firmly affixed or loose with respect to the potter's wheel;
(ii) upon determing that the lower plate is loose, removing it from the potter's wheel head;
(iii) loosening the clamps;
(iv) moving each clamp one scale unit inwardly;
(v) retightening each clamp on the lower plate;
(vi) remounting the lower plate on the potter's wheel head;
(vii) repeating steps (i) through (vii) until a tight fitting engagement between the lower plate and potter's wheel head is achieved.

BRIEF DESCRIPTION OF THE DRAWINGS

An illustrative and presently preferred embodiment of the invention is shown in the accompanying drawings in which.

DETAILED DESCRIPTION OF THE DRAWINGS

The present invention relates to equipment for use on a potter's wheel and more particularly to a pottery centering and holding device and method and apparatus for centering the device on a potter's wheel head.

Figure 11:
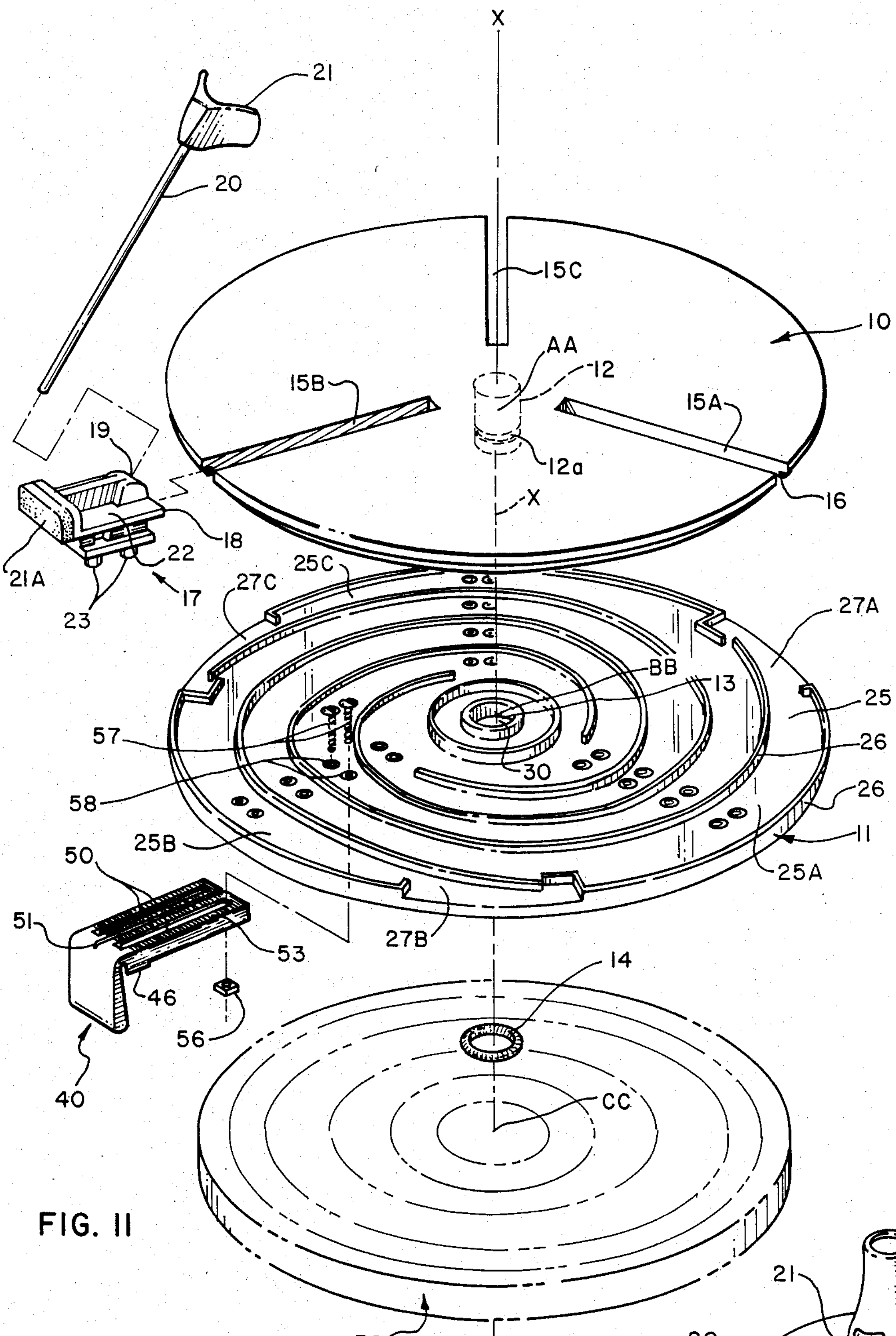
FIG. 11 is an exploded perspective view of a pottery centering and holding device and an associated potter's wheel head.

Referring to FIG. 11, it may be seen that the centering and holding device of the present invention comprises a top plate means 10 and a bottom plate means 11, each plate means being made of wood, plastic, metal or other suitable material. The plates are releaseably secured together by a securing means such as a downwardly extending sleeve 12 which is integrally formed about a centrally positioned axis AA on the first plate means 10 and which is slidingly and rotatably acceptable within a central bore portion 13 provided in coaxial alignment with central axis BB in lower plate means 11. When plate means 10 and 11 are properly coupled, the sleeve 12 depends a short distance below the lower plate lower surface and may be retained within bore 13 as by flexible 0-ring 14 positionable within a grooved portion 12*a* of the sleeve means. When properly assembled, the central axes AA and BB of the plate members are positioned in coaxial alignment with central axis CC of a potter's wheel head 38 which is in turn coaxial with the wheel head central axis of rotation XX.

The top plate is provided with a plurality of radially extending slots which in the preferred embodiment comprise three symmetrically positioned slots 15A, 15B, 15C, which extend from a position near the central axis AA of the upper plate means 10 to the periphery thereof. The slots 15A, 15B, and 15C are each of the same length and width and each slot comprises a lower under-cut portion 16 whereby each slot has a greater width on the under surface than on the top surface of the top plate.

Figure 12:
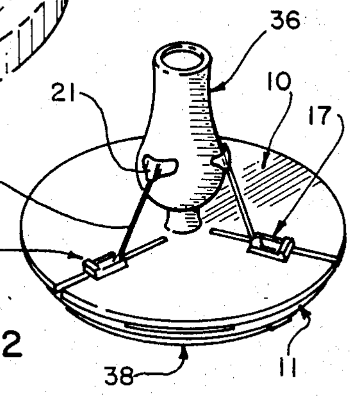
FIG. 12 is a perspective view of a piece of pottery centered on a centering and holding device which is in turn centrally mounted on a potter's wheel head.

A sliding arm means 17 (only one shown) is positioned in each slot 15A, 15B, and 15C. Each arm means may comprise a body portion 18 having an upright, slightly inclined hole 19 therein for accepting an extension member 20 having a plate contacting surface 21 at one end thereof which is used as illustrated in FIG. 12 to hold pottery of irregular shape. Various length extension members 20 may be used. The arm member 17 may be positioned at an orientation opposite that illustrated in FIG. 12 whereby another plate engaging surface 21*a* is used to engage a lower edge surface of a pot. Each arm means comprises a pair of base flanges 22 which ride on the surface at the top of the plate 10 during movement of the arm means. Each arm 17 also has a depending extension terminating in one or more guiding lugs 23 which are adapted to ride in spiral grooves formed in the top surface of bottom plate 11 as described below.

As best illustrated by FIG. 11, lower plate means 11 comprises a spiral formation on its upper surface which may comprise a plurality of spiral channels 25 defined by spiral ribs 26. In the embodiment illustrated, there are three separate spiral channel portions 25*a*, 25*b*, and 25*c*, each having a separate opening 27A, 27B, 27C at the lower plate periphery. When the plate means 10 and 11 are properly assembled, the guiding lugs 23 of the three sliding arm means are adapted, respectively, to ride within the channel means 25A, 25B, 25C. With relative rotation of upper plate means 10 with respect to lower plate means 11, the arm means are caused to move in their respective channels in a radial direction. Inward movement of the radial arm means 17 may cause them to engage and hold a pot 36 such as illustrated in FIG. 12. By reason of the special configuration of the channel means 25, each sliding arm will move the same distance upon a certain extent of relative rotation of the plates and the three arm means will move in unison.

Figure 2:
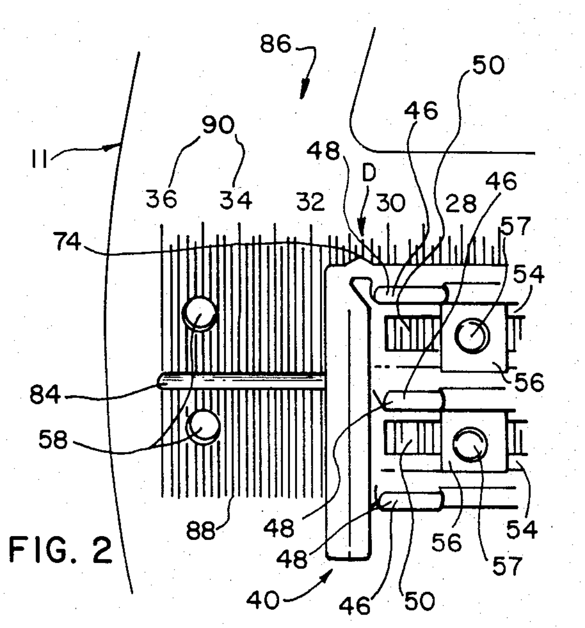
Figure 13:
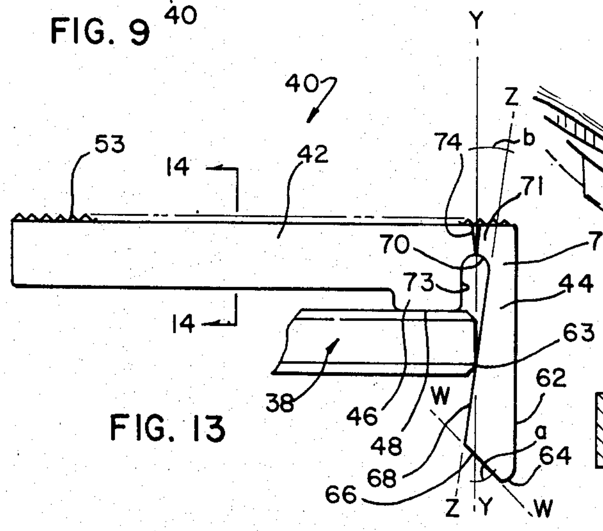
FIG. 13 is a detailed elevation view of a clamp used on a pottery centering and holding device.
Figure 14:
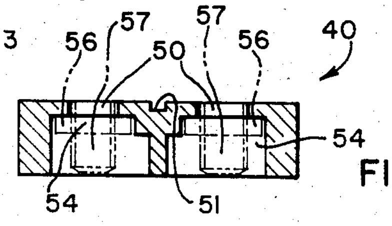
FIG. 14 is a cross-section view taken along line 14—14 of the clamp of FIG. 13.

A plurality of clamping brackets 40 are mountable in contacting engagement with the lower surface of lower plate 11. As shown by FIGS. 11 and 13, each clamping bracket, in a preferred embodiment, has an L-shaped integrally formed body having a first radially extending leg portion 42 and a second axially extending leg portion 44. The lower surface of each radially extending leg portion comprises three axially projecting contact portions 46, FIG. 2, having flat surfaces 48 thereon which contacts an upper surface of the potter's wheel head when the device is mounted thereon. Radially extending slot means, two radially extending slots 50 in the preferred embodiment, extend through the radially projecting leg portion 42 as best shown in FIGS. 2, 11 and 14. A radially extending guide groove 51 is positioned between the two slots 50 at the upper surface of radially extending leg portion 42. A plurality of transversely or chordwise extending teeth 53 are also provided at the upper surface of radially extending leg portion 42. Each of the slots 50 may have a lower enlarged portion 54, FIG. 14, adapted to engage two opposite lateral side surfaces of removable rectangular nuts 56. The nuts are threadingly mounted on bolts 57 extending axially downwardly through holes 58, FIG. 11, provided in the lower plate 11. In the preferred embodiment illustrated in FIG. 11, a plurality of series of pairs of radially spaced holes 58 are provided in the lower plate means 11. Each pair of holes 58 are circumferentially spaced apart a distance equal to the distance between clamp slots 50 and are radially spaced from one another a distance less than the length of slots 50. A series of such holes 58 is associated with each clamp 40.

As shown by FIG. 13, each clamp axially extending leg portion comprises an outer, substantially vertical surface 62 integrally connected to a beveled outwardly and downwardly extending surface 66 by a small radius arcuate surface 64 at the lower end thereof. The plane WW of beveled surface 66 is positioned at an angle "a" between 15° and 60° and preferably 45° with respect to a plane YY which is parallel to central axis XX. The beveled surface 66 causes the axially extending leg portion to be extended outwardly when surface 66 is urged against a horizontal surface such as the upper surface of the potter's wheel head 38. Integrally connected to the beveled surface is an inwardly and downwardly extending surface 68 terminating at a relatively small radius arcuate surface 70 within an axial indentation 73 which is in turn integrally connected to a surface of the radially extending leg portion 42. The arcuate surface 70 forms one surface of a relatively narrow connection portion 71 connecting radially extending leg portion 42 with the axially extending leg portion 44. The width of indentation 73 is less than the distance between two adjacent ribs 88. In a preferred embodiment, a marker 74 is provided at this portion of the clamp at a relatively centered position. Immediately adjacent the connection portion 71 is an even narrower neck portion 72 which is the area of minimum thickness along the length of the radially extending member 44. Due to this minimal thickness and also due to the fact that the neck portion 72 is positioned opposite the end of the axial extending leg 44 which encounters a contacting surface, the axially extending member tends to bend primarily about the neck portion 72.

The relative angular position "b" of the plane ZZ of the inwardly and downwardly extending surface 68 relative axially aligned plane YY is important to the operation of the invention in that if angle "b" is too large, the outer leg will not properly release under high torque conditions such as might be encountered if the holding device were to inadvertantly be engaged with a relatively fixed object during operation. On the other hand, if the angle "b" is too small, the axially extending leg portion 44 will not exert sufficient force to properly grip the peripheral surface of the potter's wheel head 38. Thus, the relative angle of surface 68 with respect to an axial direction indicated generally by line YY and angle A should be between 2° and 15° and preferably substantially 5° when the clamp means is constructed from a semi-rigid plastic.

Figure 4:
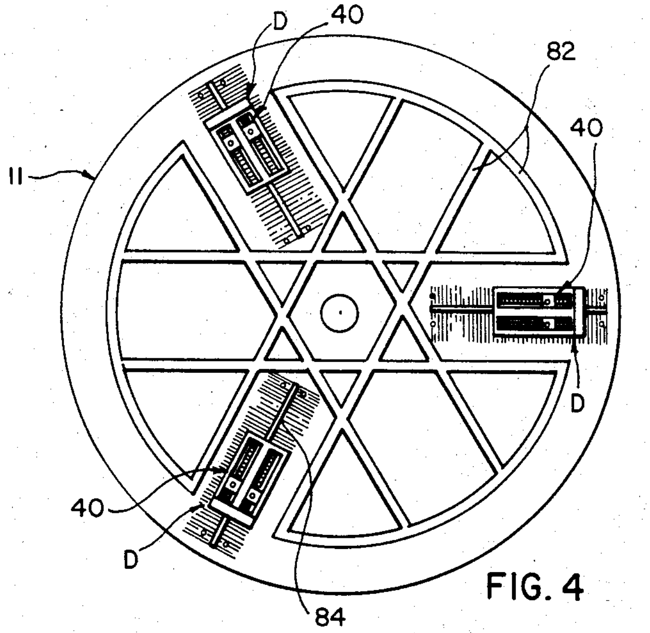

As illustrated in FIG. 4, the lower surface of lower plate means 11 may be provided with a series of rib portions 82 to provide additional strength to the lower plate. The strengthening rib portions 82 are positioned so as not to interfere with the radial movement of the clamp means 40 and are of a axial height less than the height of the clamp members, whereby the clamp members and only the clamp members make contact with the upper surface of the potter's wheel head 38, as illustrated in FIG. 13.

Guide means are provided for guiding each clamp along an accurate radial path and in the preferred embodiment. Each guide means comprise a radial guide rib 84, FIG. 4, adapted to slidingly co-act with clamp means central groove portion 51. A radial scale means 86 is provided along each central guide rib 84 to facilitate accurate placement of each clamp 40 at a predetermined radial distance from the center of the lower plate 11. In a preferred embodiment, the scale comprises a series of chordwise extending evenly, radially spaced ribs 88. In the preferred embodiment, the ribs 88 provide two functions. They indicate scale unit measurements with which marker portion 74 on each clamp means is aligned, and they also provide a portion of a holding system for locking the clamp means at discrete, precisely determined radial positions to facilitate centering of the lower plate means 11 on the potter's wheel head 38. The spacing of the clamp teeth 53 is such that one tooth portion is positioned between each pair of ribs 88, and vice versa, in the area of the scale which is in contact with a clamp 40. The teeth 53 and ribs 88 are urged into contacting and holding engagement by tightening of bolts and screws 56, 57. When an associated pair of bolts and screws are loosened, a clamp 40 may again be slidingly moved radially inwardly or outwardly along guide means 84 to a new position. A plurality of scale reference characters 90, in this case numerals, is provided on scale means 86, which corresponds with reference characters 91 on a separate measuring scale 92, FIG. 1.

The reference characters and associated marks on scale 86 are spaced apart at one-half the distance of the reference characters and associated marks on scale 92 to facilitate a mounting method, discussed in further detail hereinafter. In the embodiment shown, the reference scale 86 on lower plate means 11 is radially positioned such that a zero point on the scale 86, if fully extended, would be at the central axis BB of lower plate means 11. The point of contact 63, FIG. 13, of clamp inner surface 68 with the wheel head 38 lateral periphery, is positioned substantially in axial alignment with marker 74 whereby the position of pointer 74 will be substantially directly above the outer peripheral surface of potter's wheel head 36.

Figure 1:
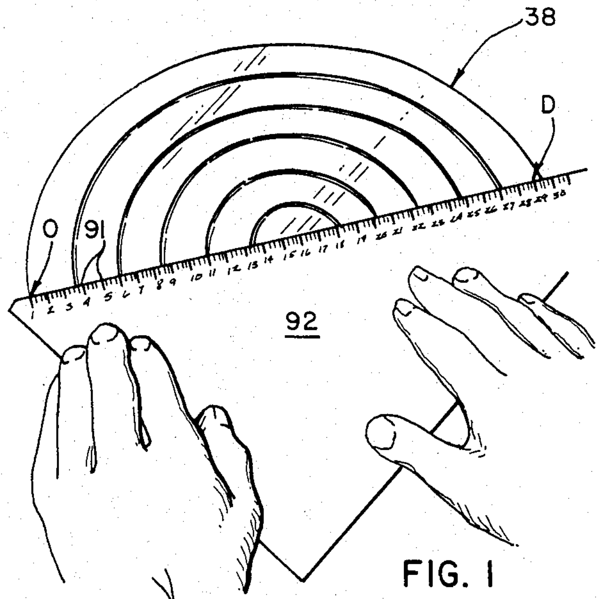
FIGS. 1 through 10 illustrate a series of steps which may be used to accurately center and mount a pottery centering and holding device on a potter's wheel head.

The manner of mounting the lower plate 11 onto potter's wheel head 38 will now be described. As illustrated by FIG. 1, the diameter of the potter's wheel head 38 is first measured using scale 92. In a preferred embodiment, the scale 92 is in centimeters. The diametric measure of the wheel 38 is indicated for purposes of reference as "D".

As illustrated by FIG. 2, pointer 74 on each bracket 40 is next positioned at a reference mark on scale 86 (which is one-half the distance of the reference characters on scale 92) corresponding to the diametric measurement "D" on scale 92. This results in an automatic conversion from diameter to radius. Discrete positioning of each clamp 40 is provided by the coaction of the teeth 53 thereof and the ribs 88 of associated scale 86.

Figure 3:
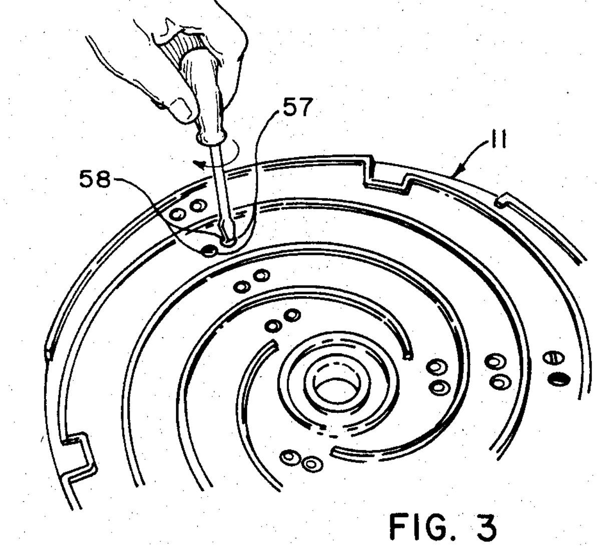

As shown by FIG. 3, screws 57 which are positioned in a pair of holes 58 axially opposite a clamp 40 are extended through the clamp slots 50 and are screwingly tightened on nuts 56 to lock the clamp 40 into place.

The foregoing procedure is followed for each clamp, resulting in the configuration, as illustrated by FIG. 4, in which each clamp is at an equal, precise, predetermined radial distance from central axis CC.

Figure 5:
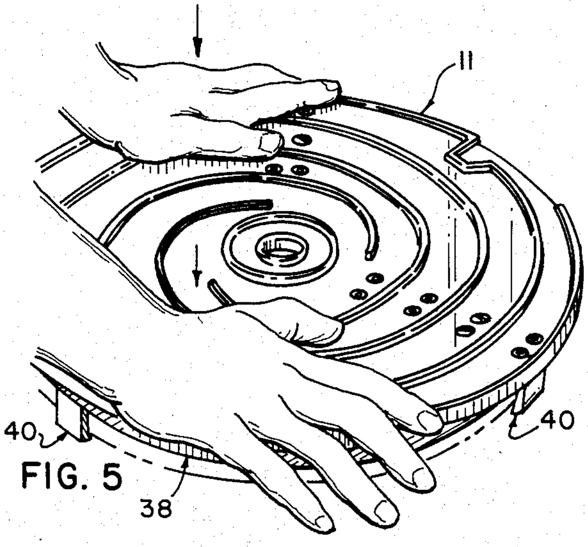

The lower plate means 11 is next urged downwardly against potter's wheel head 38, FIG. 5, with the lower plate means 11 first being positioned in substantially centered relationship therewith. The downward urging of the lower plate means 11 onto the potter's wheel head 38 should cause each clamp 40 to engage the periphery of the wheel head 38 as illustrated in detail by FIG. 13. In a properly constructed and positioned system, surface 68 of leg 44, when flexed, will always remain radially inwardly directed, or, at most not flex beyond an axial position 15.

Figure 6:
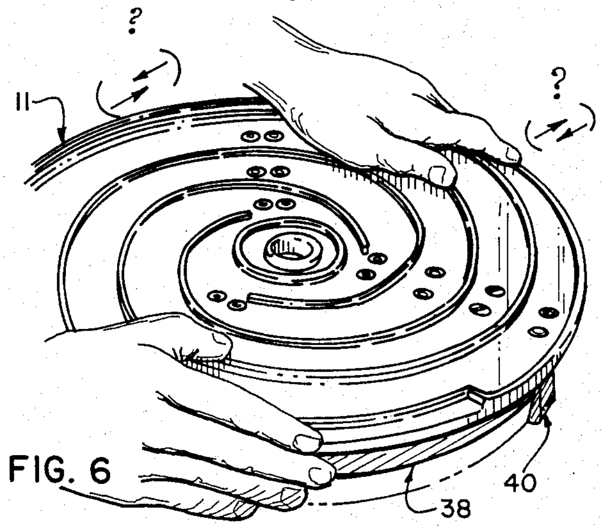
Figure 7:
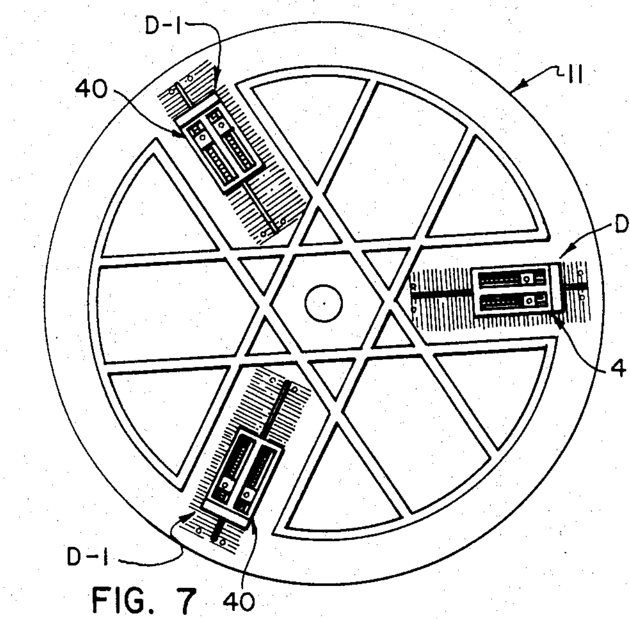

The relative tightness of the clamping arrangement is next checked by "wiggling", i.e. rotating the lower plate means 11 back and forth and from side-to-side to test the tightness of the clamping engagement, as illustrated by FIG. 6. If it is discovered that the clamping engagement is too loose, the lower plate means 11 is disengaged from the wheel by pulling it axially, upwardly therefrom and each clamp 40 is thereafter loosened and moved one scale unit, i.e. one rib 88, radially inward from its initial position at "D" to a position indicated as "D-1", FIG. 7. The lower plate means 11 is then remounted on the wheel 38 and again checked for tightness. If it is still loose, then the lower plate is again removed and the clamps moved in one more position until a properly tight relationship between the lower plate 11 and potter's wheel head 38 is achieved.

Figure 8:
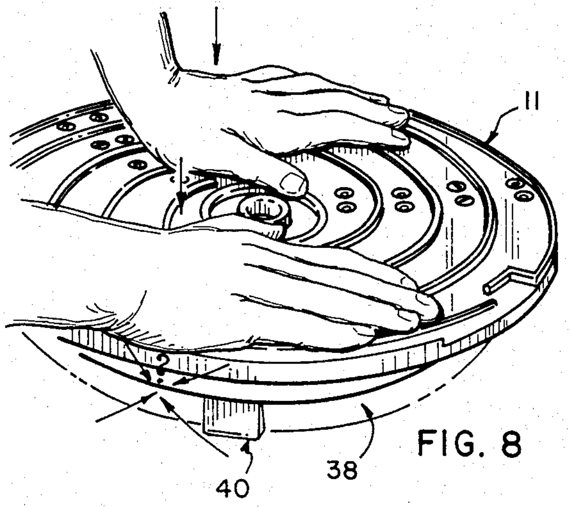
Figure 9:
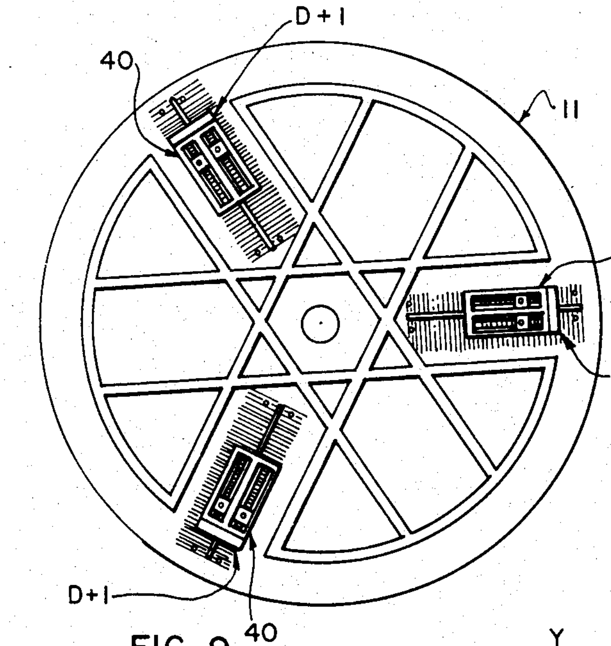
Figure 10:
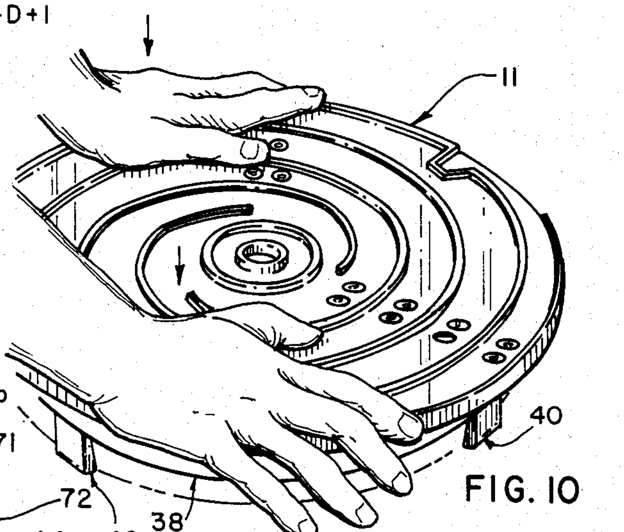

As illustrated by FIG. 8, if downward pressure on the lower plate 11 does not cause proper seating of the clamps 40 on the potter's wheel head 38, i.e. if the surface 68 is caused to be positioned in a downwardly and outwardly as opposed to a downwardly and inwardly sloping relationship with the plane of the wheel head, then the clamps are positioned too close to the center. As illustrated by FIG. 9, this is corrected by loosening the clamps and moving each clamp one unit, i.e. one rib portion 88, radially outwardly to position "D+1". As illustrated by FIG. 10, the lower plate means 11 then again clamped onto the potter's wheel head 38. If it is found that the clamps 40 are still too tight, then the operation of moving the clamps one unit outwardly and remounting the plate 11 on the wheel 38 is repeated as many times as necessary to achieve a proper fit.

By following this sequence of operations, the lower plate may be quickly and accurately centered on the potter's wheel head 38. After a properly centered relationship is established, the lower plate means is removed, the upper plate means is attached, FIG. 1, and the lower plate is again urged into a mounted relationship on the potter's wheel head 38. Arm means 17 may then be inserted into the proper grooves 15A, 15B, 15C and associated channel openings 27A, 27B, 27C and moved inwardly by rotation of upper plate means 10 with respect to lower plate means 11 until contacting and centering a desired pottery article 36, as illustrated by FIG. 12.

It is contemplated that the inventive concepts herein described may be variously otherwise embodied and it is intended that the appended claims be construed to include alternative embodiments of the invention except insofar as limited by the prior art.

What is claimed is:

1. A system for centering and supporting a pottery work piece or a pottery work piece centering and holding device on a potters wheel head positioned about a central axis of rotation extending perpendicular to the wheel head, and having a substantially cylindrical peripheral surface, the system comprising:

means in the form of a first plate designed to support a pottery work piece or a pottery work piece centering and holding device, said first plate means being substantially circular and defining a central axis of rotation extending perpendicular to said first plate means, and also having an upper surface and a lower surface;

means for operably clamping said first plate means to a potters wheel head, said clamping means comprising a plurality of said means for clamping designed to be adjusted and positioned to engage the periperal surface of a potters wheel head, said clamping means being operably and adjustably attached to said first plate means; and means for positioning said clamping means with respect to said first plate means, said positioning means including:

(a) a plurality of means for holding each of said plurality of clamping means fixedly at a precisely selected radial location on said lower surface of said first plate means;

(b) a plurality of means for guiding each of said plurality of clamping means along a predetermined path of travel, said guide means being radially located also on said lower surface of said first plate means, and (c) a plurality of scale means radially located on said lower surface of said first plate means and associated with each said guide means to facilitate the location of each of said plurality of clamping means in position at predetermined, precisely selected substantially identical radial distances from said central axis of said first plate means so that said clamping means will provide for the precise centering of said first plate means with a potters wheel head so that the central axis of rotation of said first plate means will be in substantially coaxial relationship with the central axis of rotation of such a potters wheel head.

2. The invention of claim 1 wherein said guide means is a physical discontinuity of the lower surface of said first plate means and said clamping means includes a mating discontinuity.

3. The invention of claim 2 wherein said guide means discontinuity is a guide rib and said mating discontinuity of said clamping means is a guide rib accepting groove.

4. The invention of claim 1 wherein clamp holding means are associated with each clamping means, whereby said holding means can fixedly hold said clamping means at precisely selected positions.

5. The invention of claim 4 wherein said means for holding said clamping means includes mechanical means for connecting said first plate means and said clamping means.

6. The invention of claim 1 wherein said clamping means comprises an L-shaped, resilient member having a first leg portion, and having a second leg portion integrally connected with said first leg portion, whereby said first leg portion is designed to be and in operation is located in contacting engagement and radial orientation along said guide means on said lower surface of said first plate means, and said second leg is designed to be and in operation is located away from said central axis of said first plate means and to extends generally axially away from said lower surface.

7. The invention of claim 6 wherein said clamping means first leg portion includes an upper surface and a lower surface, said upper surface of said first leg portion having chordwise extending teeth means and said lower surface of said first plate includes chordwise extending ribs, said teeth means and said ribs designed to mate with and holdingly engage one another.

8. The invention of claim 6 wherein said clamping means first leg portion has a lower surface having a contact portion thereon for engagingly contacting a peripheral surface of a potters wheel head.

9. The invention of claim 7 wherein marker means are included on said clamping means for providing a predetermined reference point on said clamping means, said marker means being designed to be positioned in readably proximate relationship with said scale means on said lower surface of said first plate means.

10. The invention of claim 9 wherein said scale means on said lower surface of said first plate means also comprises said chordwise ribs.

11. The invention of claim 10 further comprising separate measuring means to be used in combination for measuring the diameter of said potters wheel head, said measuring means including a scale having scale units that, in magnitude, are two times that of longitudinal scale units on said guide means scale means.

12. The invention of claim 11 wherein said guide means scale means is positioned along each radial guide means whereby a scale means reading indicates a scale means distance from said first plate means predetermined central axis.

13. The invention of claim 6 wherein said clamping means includes an axially oriented indented portion in the lower surface of said first leg, said indentation being adjacent to the portion of said clamping means connecting said first leg portion to said second leg portion; whereby said second leg portion is inwardly and outwardly flexibly displaceable about said first leg portion by bending at said indented portion.

14. The invention of claim 13 wherein a width of said indented portion is less than a distance between two adjacent guide means scale means.

15. The invention of claim 13 wherein said second leg portion includes a first inner surface positionable into contacting engagement with the cylindrical peripheral surface of a potters wheel head, said first inner surface extending axially downwardly and radially inwardly with respect to said indented portion; and a second inner surface portion extending downwardly and outwardly with respect to said indented portion while being integrally connected with said first inner surface portion, said second inner surface being beveled at an angle to cause outwardly flexing of said second leg portion when said second inner surface is urged downwardly against an upper peripheral edge of a potters wheel head during mounting of said first plate means thereon after said clamping means has been positioned at a predetermining position to center said first plate means.

16. The invention of claim 15 wherein, when in an unflexed position said first inner surface of said second leg is positioned at an angle of between 2° and 10° from an axial orientation with respect to said indented portion and said second inner surface is positioned at an angle of between 15° and 60° from an axial orientation with respect to said indented portion.

17. The invention of claim 1 wherein there is included second plate means for supporting a pottery work piece holding means adjustably mounted on said second plate means for adjustably holding a pottery work piece at a centered location on said second plate means; said first plate means being operably attached to said second plate means for cooperating with said holding means to provide adjustable radial movement thereof; and plate coupling means for operably attaching said second plate means to said first plate means in an axially centered and coaxial relationship.

18. A method of centrally mounting the centering device of claim 11 on a circular potters wheel head, comprising the steps of:

(a) measuring the diameter of the to-be-mounted circular potters wheel head with said separate measuring means;

(b) moving said plurality of radially displaceable potters wheel clamping means to selected positions on said plurality of radially extending guide tracks formed on said lower surface of said first plate means by locating said marker on each said clamping means into aligned relationship with said guide means scale means on said lower surface of said first plate means at a radial position on said locating scale means corresponding to one-half the wheel head diameter as measured by said first scale device;

(c) mechanically securing said clamping means into said position on said lower surface of said first plate means at the position selected on said scale means; and (d) pressing potters wheel head engaging portions of said clamping means into clamping engagement with the potters wheel head so as to affix said first plate onto the wheel head in a centered position.

19. The method of claim 18 including the steps after step (d) of:

(i) observing said clamping means axially extending potters wheel engaging second leg portion to determine if it is flexed radially outwardly;

(ii) upon determining that said second leg is flexed radially outwardly, removing said first plate means from the potters wheel head;

(iii) loosening said clamping means on said first plate;

(iv) moving each of said clamping means one scale unit radially outwardly;

(v) retightening each clamping means on said first plate means;

(vi) remounting said first plate means on the potters wheel head; and (vii) repeating the steps (i) through (vi) until achieving a mounting relationship between the first plate means and wheel head wherein said clamping means second leg portions are determined not to be flexed radially outwardly.

20. The method of claim 18 including the steps between steps (d) and (e) of:

(i) grasping said first plate means and rotating it back and forth to determine if said first plate means is firmly affixed or loose with respect to the potters wheel head;

(ii) upon determing that said first plate means is loose, removing it from the potters wheel head;

(iii) loosening said clamping means;

(iv) moving each clamp means one scale unit radially inwardly;

(v) retightening each clamping means on said first plate means;

(vi) remounting said first plate means on the potter's wheel head; and (vii) repeating steps (i) through (vi) until a tight fitting engagement between said first plate means and potters wheel head is achieved.

* * * * *